United States Patent
Huang et al.

(10) Patent No.: US 9,805,200 B2
(45) Date of Patent: Oct. 31, 2017

(54) SYSTEM AND METHOD FOR FIRMWARE VERIFICATION

(71) Applicant: Quanta Computer Inc., Taoyuan (TW)

(72) Inventors: Kuo-Shu Huang, Taoyuan (TW); Wei-Yu Chien, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 0 days.

(21) Appl. No.: 15/012,158

(22) Filed: Feb. 1, 2016

(65) Prior Publication Data
US 2017/0220802 A1    Aug. 3, 2017

(51) Int. Cl.
G06F 15/177  (2006.01)
G06F 21/57   (2013.01)
G06F 9/44    (2006.01)

(52) U.S. Cl.
CPC ............ G06F 21/575 (2013.01); G06F 9/442 (2013.01); G06F 21/572 (2013.01); *G06F 2221/033* (2013.01)

(58) Field of Classification Search
CPC ....... G06F 21/572; G06F 9/442; G06F 21/575
See application file for complete search history.

(56) References Cited

U.S. PATENT DOCUMENTS

| | | | | |
|---|---|---|---|---|
| 7,243,237 B2* | 7/2007 | Peinado | ................. | G06F 21/83 713/181 |
| 7,636,442 B2* | 12/2009 | Scarlata | ................. | G06F 21/53 380/283 |
| 8,418,259 B2* | 4/2013 | Horal | ................. | G06F 21/10 713/187 |
| 9,230,112 B1* | 1/2016 | Peterson | ................. | G06F 21/575 |
| 2004/0230805 A1* | 11/2004 | Peinado | ................. | G06F 21/83 713/181 |
| 2008/0273550 A1* | 11/2008 | Dandekar | ................. | G06F 11/0793 370/465 |

(Continued)

FOREIGN PATENT DOCUMENTS

| CN | 103136485 A | 6/2013 |
|---|---|---|
| CN | 105160255 A | 12/2015 |

OTHER PUBLICATIONS

TW Office Action for Application No. 105111768, dated Jul. 10, 2017, w/ Office Action Summary.

*Primary Examiner* — Abdelmoniem Elamin
(74) *Attorney, Agent, or Firm* — Nixon Peabody LLP; Eduardo J. Quinones

(57) ABSTRACT

A system, method and computer-readable storage devices for providing protection mechanisms to a server motherboard prior to its booting. A system configured according to this would, upon receiving power at a motherboard, and prior to booting the motherboard: generate a nonce, send the nonce to a first component on the motherboard, and send the nonce to a second component on the motherboard. The system then receives a response from at least one of the first component on the motherboard and the second component on the motherboard, wherein the response is based on a communication protocol between the first component and the second component, the communication protocol utilizing the nonce. When the response indicates a correct hardware configuration, the system performs the booting of the motherboard.

20 Claims, 11 Drawing Sheets

(56) References Cited

U.S. PATENT DOCUMENTS

| | | | | |
|---|---|---|---|---|
| 2011/0167503 A1* | 7/2011 | Horal | ............... | G06F 21/10 |
| | | | | 726/33 |
| 2012/0288092 A1* | 11/2012 | Cakulev | ............... | H04L 9/0894 |
| | | | | 380/255 |
| 2015/0199520 A1* | 7/2015 | Woolley | ............... | G06F 21/575 |
| | | | | 713/2 |

* cited by examiner

SYSTEM AND METHOD FOR FIRMWARE VERIFICATION

BACKGROUND

1. Technical Field

The present disclosure relates to firmware verification and more specifically to preventing malicious firmware updates from activating a server motherboard.

2. Introduction

In the past decade, Intel and other chipset vendors have integrated more and more functions inside of their chip packages. For example, a common chip design now includes a core processor, memory controllers, an integrated I/O controller, a USB controller, SATA controller, etc. Chip manufactures can even provide a customer reference board (CRB) and silicon firmware reference code to help Original Design Manufactures (ODM) of the server motherboard designs. This ability to customize chips based on the requirements of the original design manufactures of motherboards means that changes to the chips are limited to I/O peripherals, layout, component placement, and firmware design. In the other words, the design of server motherboards has become more regular and less complex as complicated engineering and design has moved to silicon (that is, the chips themselves).

Recently, open source foundations, such as the Open Compute Project (OCP) Foundation, have begun encouraging designers to openly sharing ideas, specifications, and other intellectual property over the Internet, with the benefit of providing a public structure to having designs saved in a shared database. Users of these open source foundations can then access the records database and produce any per design documents available.

In recent years, malicious attacks from malware, worm and virus has been moving from software to firmware, especially the Unified Extensible Firmware Interface (UEFI) Basic Input/Output System (BIOS) and Baseboard Management Controller (BMC) firmware. As illustrated in FIG. 2, because portions of these firmware components are from open source foundations 202 and forums 204, the potential exists for nefarious deeds by hackers using open source code databases. Specifically, malfeasors could download firmware specifications 208 without restriction, study them all to figure out possible security vulnerabilities, and take advantage of those vulnerabilities to illegally access and/or harm the server. Specifically, these hackers can replace firmware 210 of a server motherboard with firmware lacking various security protocols, then boot the server without those security functions enabled 212. Because the security functions are disabled, the hacker can then plant virus/malware software into the operating system as the motherboard is booting 214, then propagate the virus through an Intranet 216 and the various rack servers 218. Even though user may setup a security mechanism inside the firmware of server motherboard, such as security boot or user password, data is at a high risk when firmware may be replaced using open sourced information because server motherboards rarely perform security inspections on replacement firmware.

SUMMARY

Systems, motherboards, computer-readable storage devices, and entities practicing concepts as disclosed herein can verify hardware and/or firmware configurations prior to booting of a motherboard. For example, a system configured according to this disclosure would, upon powering on a motherboard, but before completion of the motherboard boot process: generate a nonce (a single-use passphrase), send the nonce to a first component of the motherboard, and send the nonce to a second component of the motherboard. The system then receives a response from one or more of the motherboard components (the first component and the second component), where the response is based on communications between the first component and the second component, the communications using the nonce. When the response indicates a correct hardware and/or firmware configuration, the system performs the booting of the motherboard.

DETAILED DESCRIPTION

Figure 1:
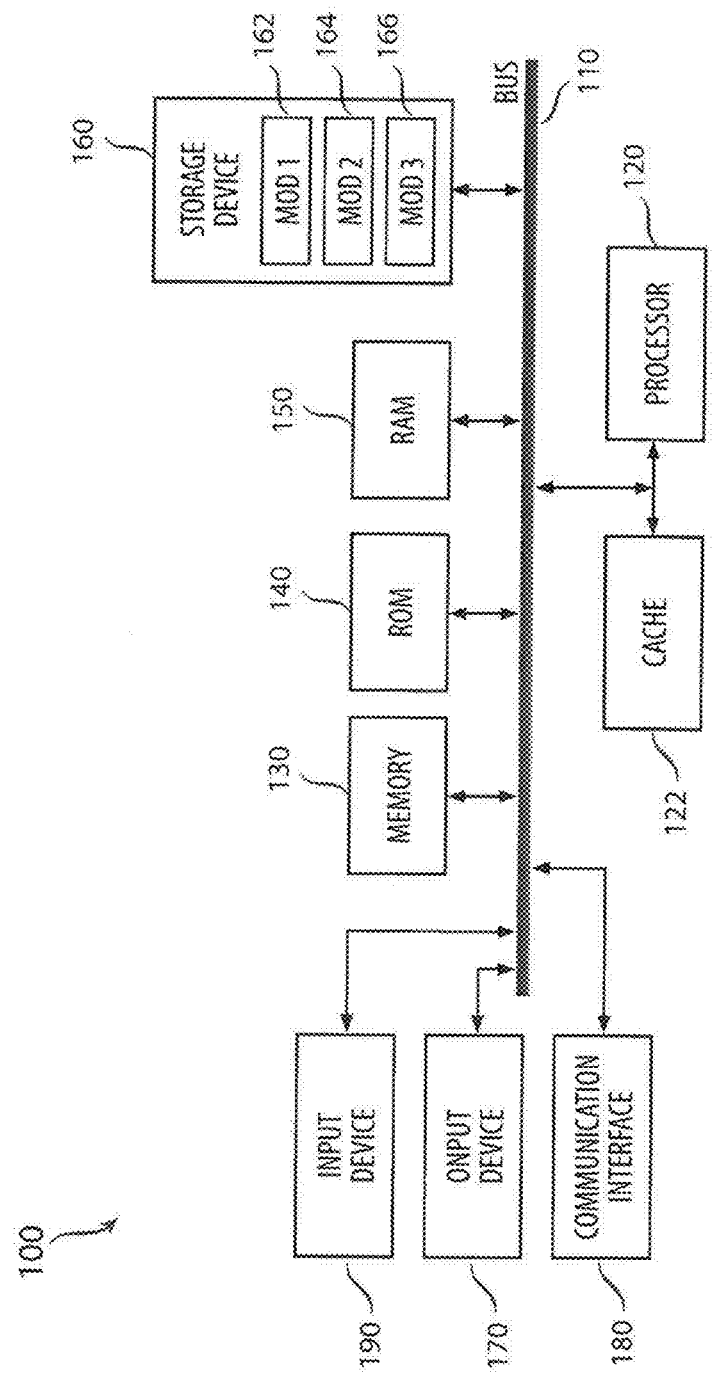
FIG. 1 illustrates an example system embodiment.

A system, method and computer-readable storage devices are disclosed which provide a protection mechanism of a server motherboard prior to its booting. This protection is enabled by creating new private of communication across server motherboard hardware components, such as the BMC and a UEFI BIOS, when the server motherboard powers on. This mechanism forces the BMC, UEFI BIOS, and the server motherboard to communicate with each other using a dynamically protocol which is initiated by nonce generator, a nonce being a word, code, or passphrase used on only a single occasion. Each component of the motherboard must respond correctly to received inputs until the verification process is completed, and if any component fails to respond correctly the result is a shutdown of power to the server motherboard. The Complex Programmable Logic Device (CPLD) of the server motherboard is a root trusted module which can be one of the components used to verify the firmware configuration. For example, when a fake UEFI BIOS and BMC firmware is reprogrammed, the CPLD can check a received sequence by comparing the received sequence to a correct sequence. If the received sequence does not match the correct sequence, this indicates a fake firmware component which doesn't know algorithm of communication. The CPLD (or other firmware component) will then immediately shutdown power to the server motherboard.

As an example, a system configured according to this disclosure would, upon receiving power at a motherboard, and prior to booting the motherboard: generate a nonce, send the nonce to a first component on the motherboard, and send the nonce to a second component on the motherboard. The system then receives a response from at least one of the first component on the motherboard and the second component on the motherboard, wherein the response is based on a communication protocol between the first component and the second component, the communication protocol utilizing the nonce. When the response indicates a correct hardware configuration, the system performs the booting of the motherboard.

Various embodiments of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A brief introductory description of a basic general purpose system or computing device in FIG. 1 which can be employed to practice the concepts, methods, and techniques disclosed is illustrated. A more detailed description of firmware verification will then follow, accompanied by examples and variations. These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

A BMC (baseboard management controller) can be a specialized microcontroller or processor on the system 100. In some cases, the BMC can be part of an Intelligent Platform Management Interface (IPMI). Moreover, in some cases, the BMC can be embedded on a motherboard or main circuit board of the system 100. The BMC can manage the interface between system management software and platform hardware. Different types of sensors built into the system 100 can report to the BMC on parameters such as temperature, cooling fan speeds, power status, operating system (OS) status, and so forth. The BMC can monitor the sensors and send alerts to an administrator via a network interface, such as communication interface, if any of the parameters do not stay within preset limits or thresholds, indicating a potential failure or error of the system 100. The administrator can also remotely communicate with the BMC to take some corrective action, such as resetting or power cycling the system 100 to restore functionality.

Firmware can include a Basic Input/Output System or its successors or equivalents, such as an Extensible Firmware Interface (EFI) or Unified Extensible Firmware Interface (UEFI). The firmware can be loaded and executed as a sequence program each time the system 100 is started. The firmware can recognize, initialize, and test hardware present in the system 100 based on the set of configurations. The firmware can perform a self-test, such as a Power-on-Self-Test (POST), on the system 100. This self-test can test functionality of various hardware components such as hard disk drives, optical reading devices, cooling devices, memory modules, expansion cards and the like. The firmware can address and allocate an area in the memory 130, ROM 140, RAM 150, and/or storage device 160, to store an operating system (OS). The firmware can load a boot loader and/or OS, and give control of the system 100 to the OS.

A complex programmable logic device (CPLD) is a programmable logic device with complexity similar to that of PALs and FPGAs, and architectural features of both. The main building block of the CPLD is a macrocell, which contains logic implementing disjunctive normal form expressions and more specialized logic operations. CPLDs can be useful in implementing moderately complicated data processing on a chip level, and can be a component on a motherboard as discussed herein.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
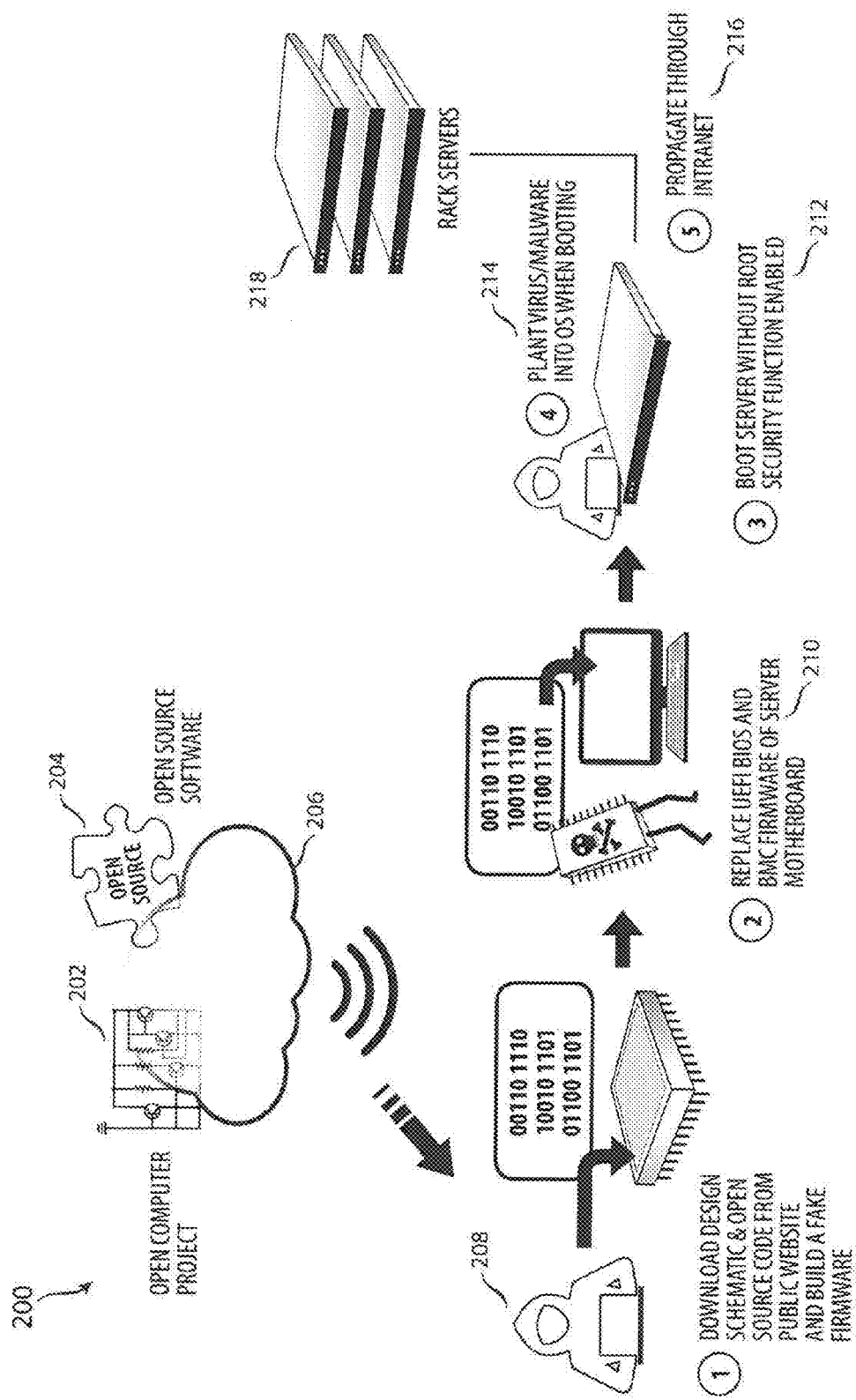
FIG. 2 illustrates an example of a using fake firmware within a motherboard.
Figure 3:
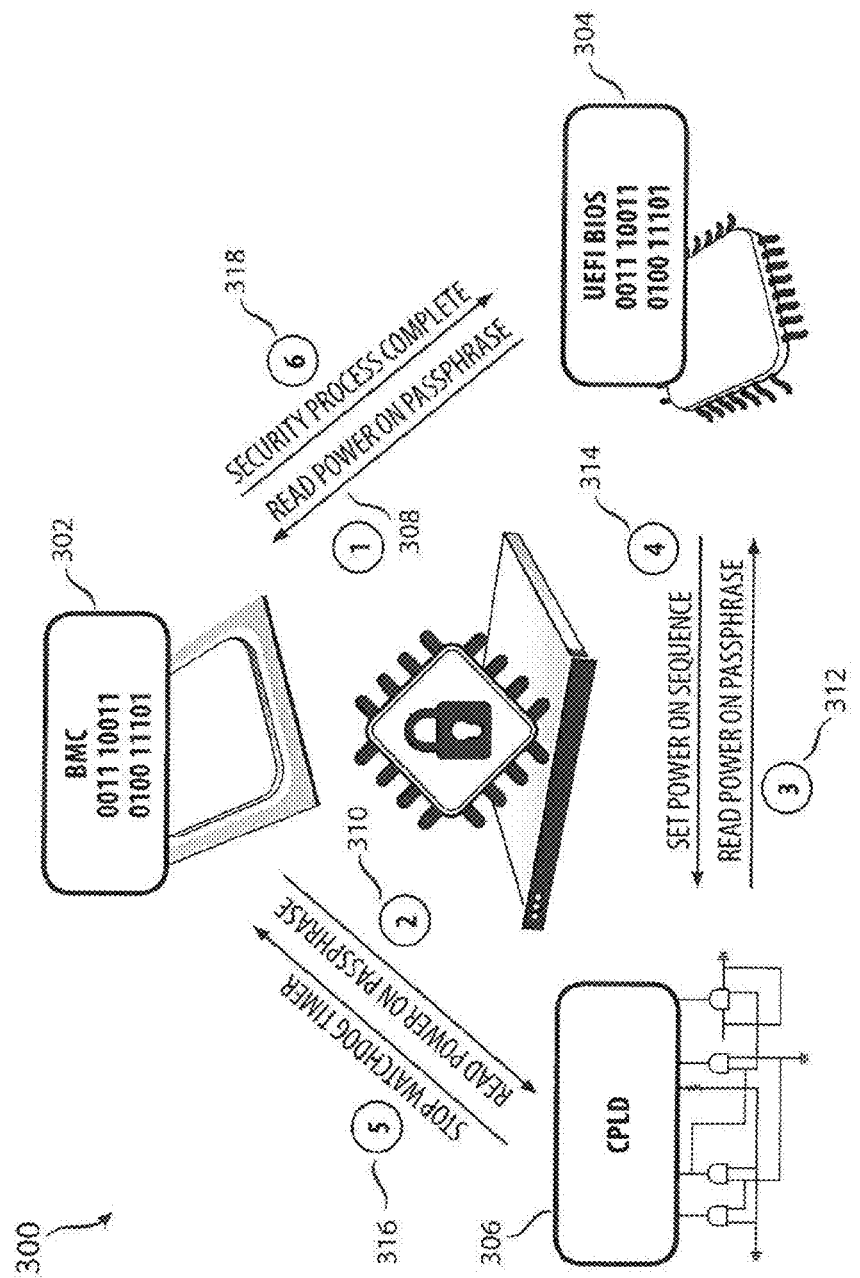
FIG. 3 illustrates a first example of private communications across server motherboard components.

Having disclosed some components of a computing system, and previously discussed the dangers of hackers replacing firmware with fake firmware in FIG. 2, the disclosure now turns to FIG. 3, which illustrates a first example of private communications across server motherboard components. In this example 300, the firmware verification of a server motherboard is performed by communicating a passphrase between motherboard components 304, 302, 306 and, if the mother board components provide the correct response to the inputs, initiating a power-on sequence of the motherboard.

In this example 300, a passphrase is generated on the motherboard (for example, using the UEFI BIOS) 304. The passphrase is, preferably, a nonce—a single use passphrase which is randomly (or pseudo-randomly) generated. The passphrase is read 308 by a first component 302 of the motherboard (for example, the BMC). Using a communication protocol, a second component (for example, a CPLD) 306 reads 310 the passphrase which was read by the BMC 302. If the CPLD 306 identifies that passphrase of the BMC 302 is incorrect, or has not been correctly modified by the BMC, the CPLD 306 can initiate a motherboard shutdown sequence. Likewise, the motherboard itself (via a component such as the UEFI BIOS 304) reads the passphrase 312 received or modified by the CPLD 306 and similarly makes a determination as to the correct nature of the passphrase. While in this illustration 300 verification occurs between three points—the UEIF BIOS 304, the BMC 302, and the CPLD 306—in other configurations additional or fewer components can be found.

After the components have received the passphrase and verified the validity of the passphrase, the power-on sequence is initiated. In some configurations, such as that in FIG. 3, the power-on sequence is communicated in reverse order from the reading of the passphrases. As illustrated, upon confirming the passphrase from the CPLD 312, the motherboard initiates a "set power-on sequence" 314 which is sent to the CPLD 312, and if the passphrase received 310 by the CPLD 312 from the BMC 302 is correct the power-on sequence is continued with the CPLD 306 stopping a watchdog timer 316 via communications with the BMC 302. The BMC 302, upon receiving notification that the watchdog timer has been stopped 316, completes the security process 318, at which time the motherboard can complete a boot-up process.

As noted above, systems configured according to this disclosure can perform firmware verification with additional, or fewer, components. In addition, the "power-on" sequence can occur after each individual firmware component is verified, or can occur once all the firmware components are verified. For example, if the BMC 302 failed to correctly provide a passphrase to the CPLD 306, the power-on sequence could immediately be terminated, without requiring additional verification 312 of the CPLD 306 by the UEFI BIOS 304.

Figure 4:
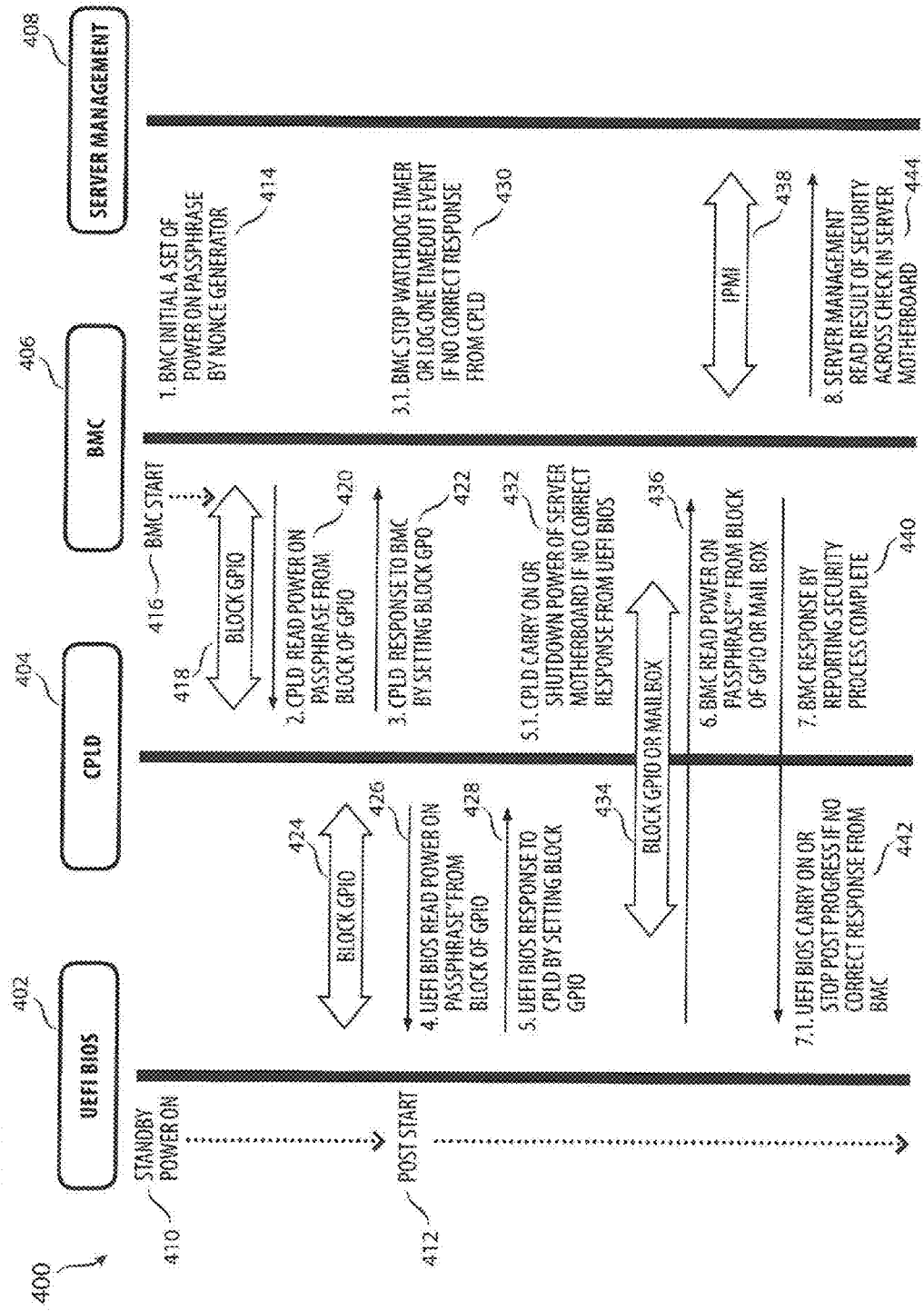
FIG. 4 illustrates a second example of private communications across server motherboard components.

FIG. 4 illustrates a second example 400 of private communications across server motherboard components 402, 404, 406, 408. As server motherboard powers on 410 and initiates a Power-on Self-Test (POST) process 412, a private communication is communicated between server motherboard hardware components (UEFI BIOS 402 and BMC 406) until a security process is completed. In case of a component sending a message cannot deliver a "Power On Passphrase" to a subsequent component and also correctly receive feedback from that component, a policy could be executed to shutdown power to the server motherboard immediately, terminating the POST process.

On the server motherboard, each of components 402, 404, 406, 408 has its unique hardware interface and communication protocol to one another. The various components 402, 404, 406, 408 of the server motherboard can communicate by setting and reading blocks of General Purpose Input/Output (GPIO). In this illustrated example 400, the power on 410 initiates a BMC start 416, at which time the BMC 406 receives an initial power-on passphrase generated by a nonce generator 414. This passphrase can come from another component on the server motherboard, from the server management 408, or from a module of the BMC 406. The BMC 406, upon receiving the passphrase, can perform an algorithm or other data manipulation on the passphrase, to modify or otherwise alter the passphrase. For example, the BMC could add "2" to the received passphrase. The BMC 406 then stores the modified passphrase in a block GPIO 418 which is accessible by the CPLD 404. At the same time, the BMC 406 initiates a watchdog timer which, if no response is received from the CPLD 404 within a predetermined amount of time, will cause a termination of the POST process.

The CPLD 404 reads the passphrase from the block of GPIO 420 and responds to the BMC 406 by setting a block GPO (General Purpose Output) 422. The CPLD 404, upon receiving the passphrase from the block of GPIO 420 from the BMC 406, can also perform calculations or algorithms on the received passphrase, at which time the modified passphrase is recorded in another block of GPIO 424. This block of GPIO 424 is read by the UEFI BIOS 402, 426, and the UEFI BIOS 402 responds to the CPLD by setting a block GPIO 428. The CPLD 404, upon receiving the response from the UEFI BIOS 402 via the block GPIO 434 set by the UEFI BIOS 402, 428, compares the response received versus an expected response. If the response received is incorrect, or if there is no response, the CPLD can initiate a shutdown of power and/or the boot process 432. The BMC can also read the GPIO 436 and respond accordingly. Depending on specific configurations, the UEFI BIOS 402 can also perform a verification of the output of the BMC 406, 442 in response to this reading of the updated passphrase, or can be configured to look only at output from the CPLD 404. If the passphrase received is correct, the BMC responds by reporting the security process is complete 440 and communicates to the server management 408, via an Intelligent Platform Management Interface 438, the results of security checks in the server motherboard 444.

Figure 5:
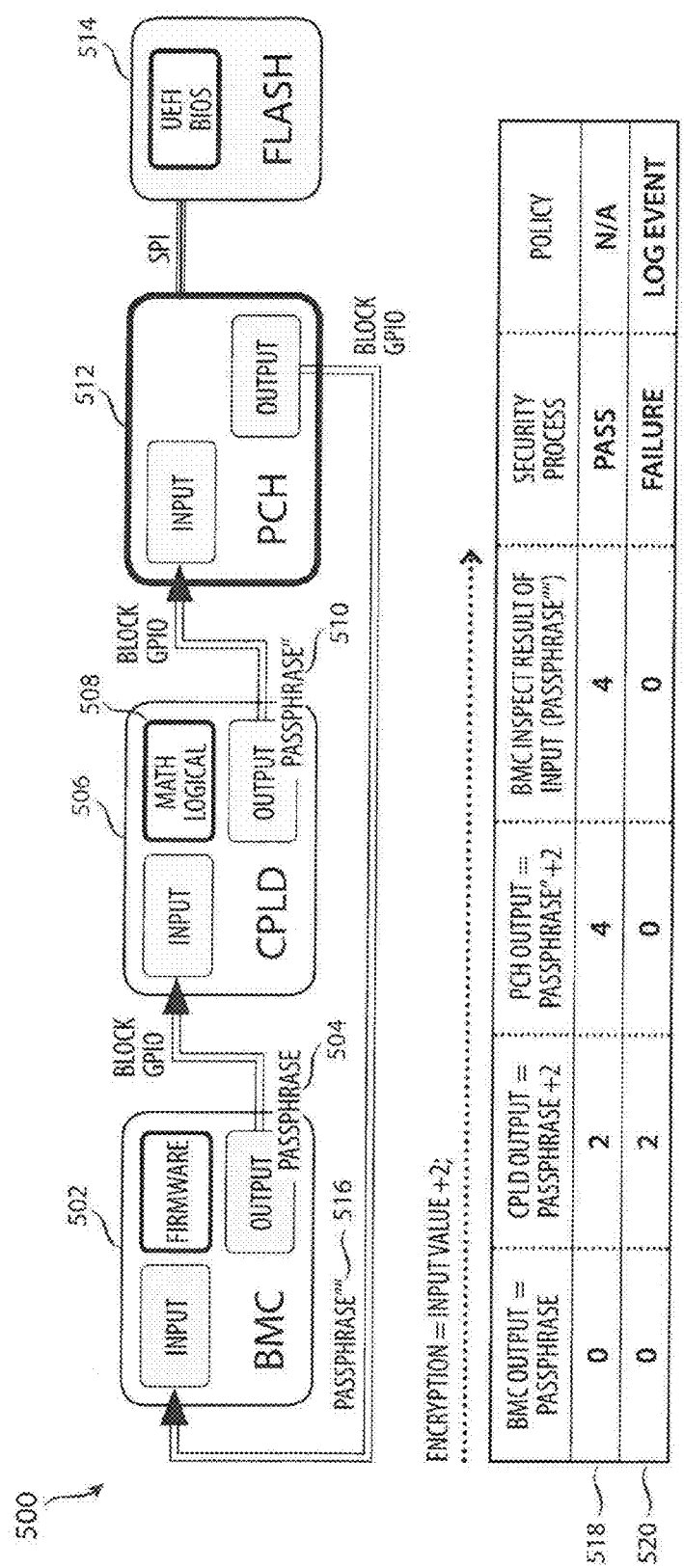
FIG. 5 illustrates a hardware connection between components of a motherboard.

FIG. 5 illustrates a hardware connection 500 between components 502, 506, 512 of a motherboard. A new design of hardware communication is added from the BMC 502 to the CPLD 506, the CPLD 506 to the PCH 512, and the PCH 512 to the BMC 502. The physical hardware interface could be connected using Block GPIO or more complex hardware protocol depending on the design of the CPLD 506.

In this example, the components are configured to "encrypt" the passphrase as it is passed from each component. As an example, the encryption will be to apply math to the passphrase stored in the block GPIO by adding "2" to the received value (although any number or value could also be used). The chart illustrates a hardware configuration which passes 518 and a hardware configuration which fails 520. In the hardware configuration which passes 518, the BMC 502 receives or generates a nonce passphrase 504, which is stored in block GPIO storage. The BMC 502 output (passphrase) is, for illustration purposes only, "0," and is read by the CPLD 506 as input. The CPLD performs a mathematical algorithm 508 on the passphrase, generating an updated passphrase (passphrase"). In this illustration, the mathematical algorithm is the input+2, resulting in the "CPLD Output" of "2" in the chart 518. The "2" of the passphrase" is read as input by the PCH 512, which performs additional mathematics, resulting in a passphrase"" of "4," which is recorded in the GPIO and read by the BMC and the UEFI BIOS 514. Because the final result output by the PCH 512 corresponds to the correct value, the security process considers the firmware validated and issues a "Pass" result, allowing the motherboard to power on.

However, if the firmware had been modified by someone who did not know the encryption algorithm, the final result issued by the PCH would not have been "4," and the security process would have resulted in a failure. Consider the example of failure illustrated 520. Here, the output of the CPLD was correct (a "2"), however the PCH produced a "0" instead of a "4," indicating the PCH has been corrupted. Accordingly, the security process prevents the power-on process of the motherboard. In addition, the event can be logged for future review or data aggregation.

Figure 6:
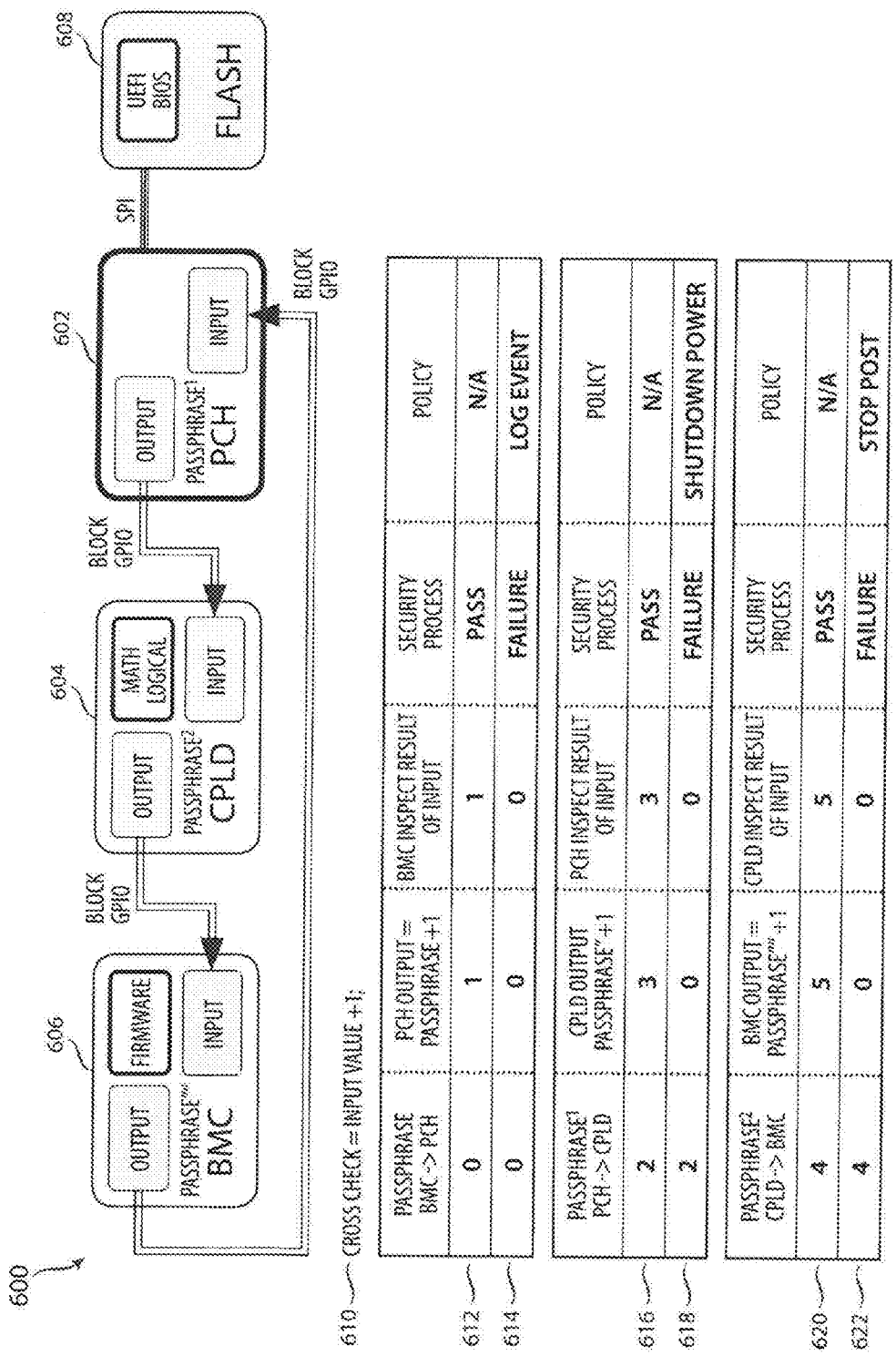
FIG. 6 illustrates crosschecking between the components of a motherboard.

FIG. 6 illustrates crosschecking 600 between the components of a motherboard. In one circumstance, the configuration illustrated can be used to confirm if and where firmware has been improperly modified. In addition, the configuration illustrates how the motherboard can confirm results. In this illustration 600, the components 602, 604, 606 have a flow of communications opposite that of FIG. 5. That is, the PCH 602 saves, to a block GPIO, a passphrase, the CPLD 604 receives that passphrase and performs calculations, then saves the modified passphrase to a block GPIO (which can be the same block GPIO or a distinct block of GPIO as used by the PCH 602), which is read by the BMC 606. The passphrase received by the BMC 606 is again modified, saved, and subsequently read by the PCH 602. Based on these communications, and the UEFI BIOS 608, the status of the firmware can be verified.

As further illustrated, in this case the cross check/calculation performed is adding a "1" to the value received 610. For example, in the communications between the BMC 606 and the PCH 602, if the passphrase received by the BMC 606 were "0", a proper output of "1" would result in a pass result 612, whereas a "0" or other value would result in a failure 614. Similarly, as illustrated the CPLD 604 receives a passphrase from the PCH 602, then adds "1". If the value of the result complies, 616, the CPLD 604 is considered verified 616 and a "pass" is identified. If the PCH inspects the CPLD 604 output and the result is not the value of the input plus "1", a failure has occurred 618. Similar verification steps occur for the CPLD 604 to BMC 606, with pass 620 or failure 622 statuses being issued.

The results of the failures can vary based on which firmware components failed. For example, and as illustrated, if the PCH were to fail 614, the policy can require logging of the event, but not preventing booting of the motherboard. If the CPLD 604 were to fail 618, the result could be to immediately shutdown power to the motherboard. If the BMC 606 were to fail 622, the result could be to immediately stop the POST process. Such policies are exemplary only, and can be combined or modified as required. For example, in certain configurations, the result of any one failure could be to log the error, but upon finding two errors the system stops the self-test process. In another example, each component is tested in multiple directions (i.e., the input received from different sources and output sent to different sources, such as how the "direction" of data flow varies between FIG. 5 and FIG. 6). In such a configuration, an error in one direction could result in stopping or preventing a part of the POST process, but an error in two directions would result in a shutdown of power to the motherboard.

In addition, communications between motherboard components can be performed using other mechanisms besides the use of block GPIO storage and retrieval. For example, an alternative communication method between UEFI BIOS and BMC firmware could be OEM (Original Equipment Manufacturer) IPMI (Intelligent Platform Management Interface) commands or a private mail box (supported by chip design). For example, the OEM IPMI commands could report status of server malware firmware inspection, read power on passphrase from UEFI BIOS, and/or deliver status of cross checking from BMC to UEFI.

Having disclosed some basic system components and concepts, the disclosure now turns to the exemplary method embodiments shown in FIGS. 7-11. For the sake of clarity, the methods are described in terms of an exemplary system 100 as shown in FIG. 1 configured to practice the method. The steps outlined herein are exemplary and can be implemented in any combination thereof, including combinations that exclude, add, or modify certain steps.

Figure 7:
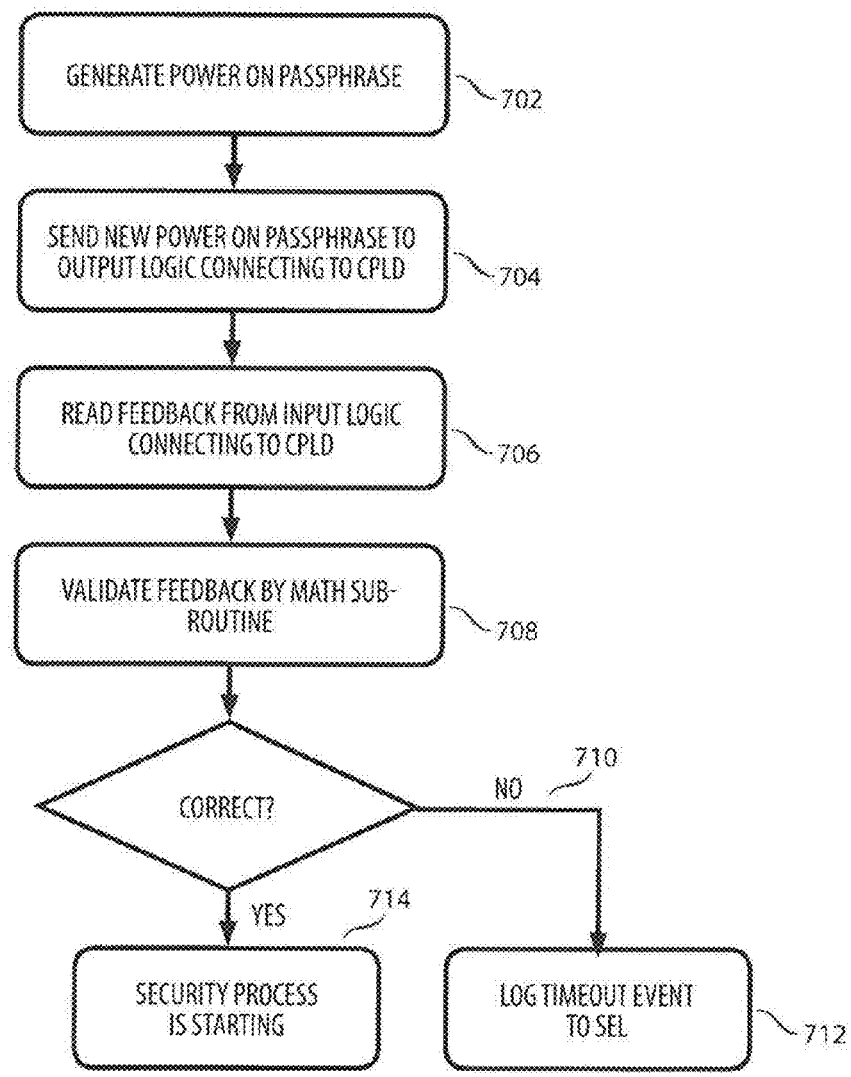
FIG. 7 illustrates first exemplary logic of a complex programmable logic device to deliver a passphrase and validate feedback.

FIG. 7 illustrates first exemplary logic of a complex programmable logic device to deliver a passphrase and validate feedback. Specifically, FIG. 7 illustrates logic which can be added into a BMC firmware design for beginning communications. It includes generation of a passphrase upon receiving power (702), sending the new power-on passphrase to output logic connecting to the CPLD (704), reading feedback from input logic connecting to the CPLD (706), and validating the feedback by a math subroutine (708). If the feedback received is not as expected, the BMC firmware will log a timeout event to the SEL (Server Event Log) (712). If the feedback is as expected, the security process for powering on the motherboard will be initiated (714).

Figure 8:
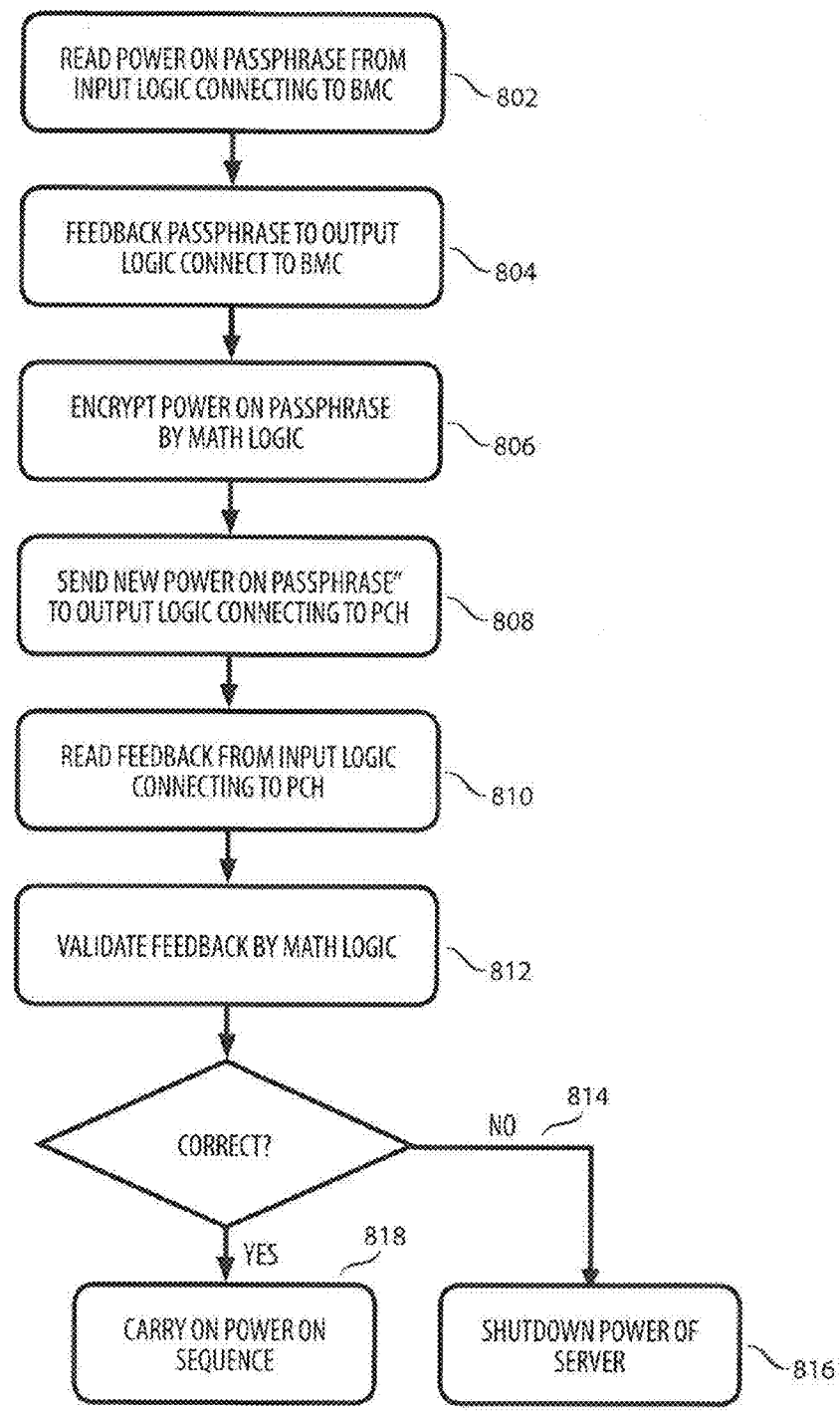
FIG. 8 illustrates second exemplary logic of a complex programmable logic device to deliver a passphrase and validate feedback.

FIG. 8 illustrates second exemplary logic of a complex programmable logic device to deliver a passphrase and validate feedback. Specifically, FIG. 8 illustrates logic which can be added into a CPLD for communicating with other firmware on the motherboard. As illustrated, the CPLD, with this logic, would read the power-on passphrase from input logic connecting to the BMC (802). The CPLD would send feedback to the BMC regarding the passphrase using output logic connected to the BMC (804), and encrypt the read passphrase using math logic (806). For example, if the passphrase is a number, the math logic could require adding, subtracting, or enacting other math operations on the received number. This modified/new passphrase is sent to the PCH using output logic connecting the CPLD and the PCH (808), and feedback is received from the PCH (810). The feedback from the PCH is confirmed as valid using math logic (812), which can be the same or different than the math logic previously used by the CPLD. If the feedback is correct, the CPLD carries on the power-on sequence (818), whereas if the feedback is incorrect (814) the CPLD shuts down the powering of the server (816).

Figure 9:
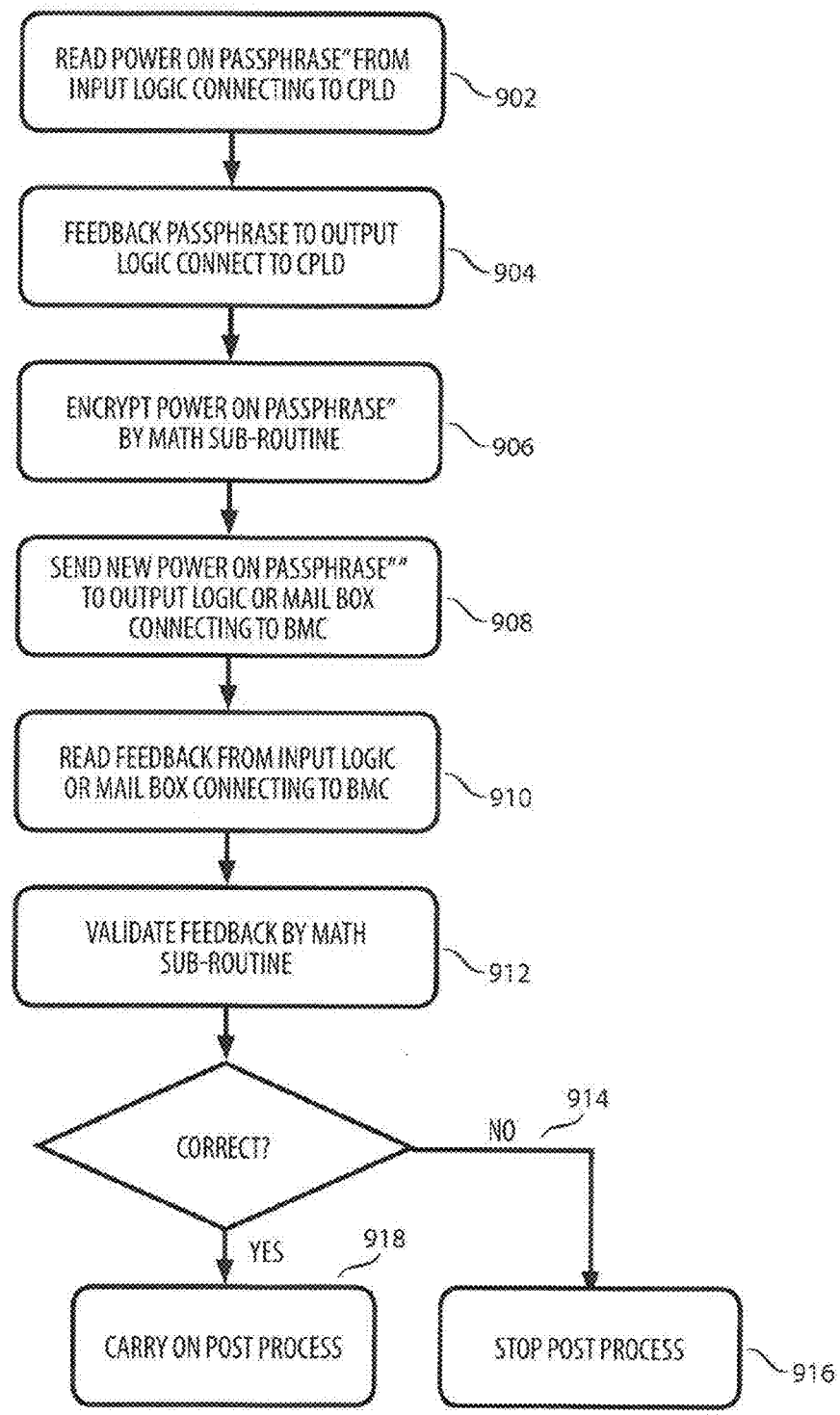
FIG. 9 illustrates third exemplary logic of a complex programmable logic device to deliver a passphrase and validate feedback.

FIG. 9 illustrates third exemplary logic of a complex programmable logic device to deliver a passphrase and validate feedback. Specifically, FIG. 9 illustrates a new sub-routine which can be added into the UEFI BIOS. A UEFI BIOS configured with this sub-routine reads the power-on passphrase from the CPLD (902), provides feedback to the CPLD (904) indicating the passphrase was received, encrypts the passphrase using a math subroutine (906), and sends the updated encrypted/modified power-on passphrase to output logic or a mailbox connected to the BMC (908). The UEFI BIOS then receives feedback from the input logic/mailbox connected to the BMC (901) and validates the feedback by a math sub-routine (912). If the feedback received is correct, the UEFI BIOS carries out the power-on self test process, whereas if the math subroutine indicates the feedback received was not correct (914), the power-on self test is stopped (916).

Figure 10:
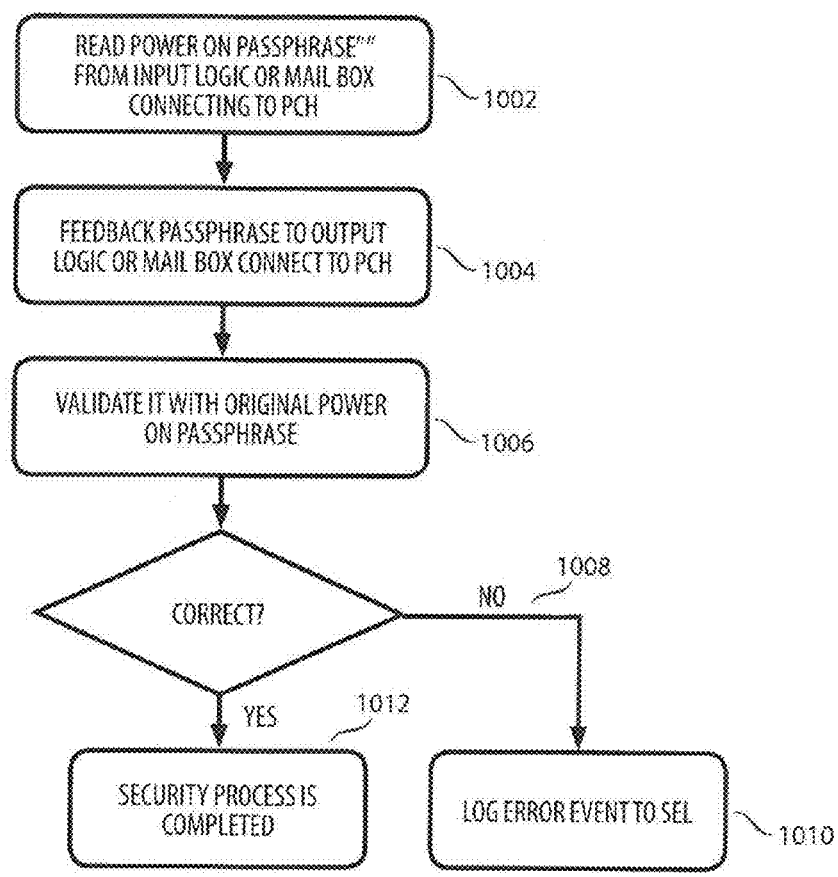
FIG. 10 illustrates a fourth exemplary logic of a complex programmable logic device to deliver a passphrase and validate feedback.

FIG. 10 illustrates a fourth exemplary logic of a complex programmable logic device to deliver a passphrase and validate feedback. Specifically, FIG. 10 illustrates a sub-routine which can be added into BMC firmware for final examination. A BMC with this sub-routine reads a power-on passphrase (such as a passphrase', indicating it has been through two components) which has been manipulated/adjusted by other components from input logic or a mailbox connected to the PCH (1002). The BMC provides feedback to the PCH via output logic or the mailbox (1004), and validates the passphrase received by comparing it with the original passphrase (1006). If the received passphrase is correct, the security process is completed (1012). If, however, the received passphrase is incorrect (1008), the error is logged into the SEL (Server Error Log) (1010).

Figure 11:
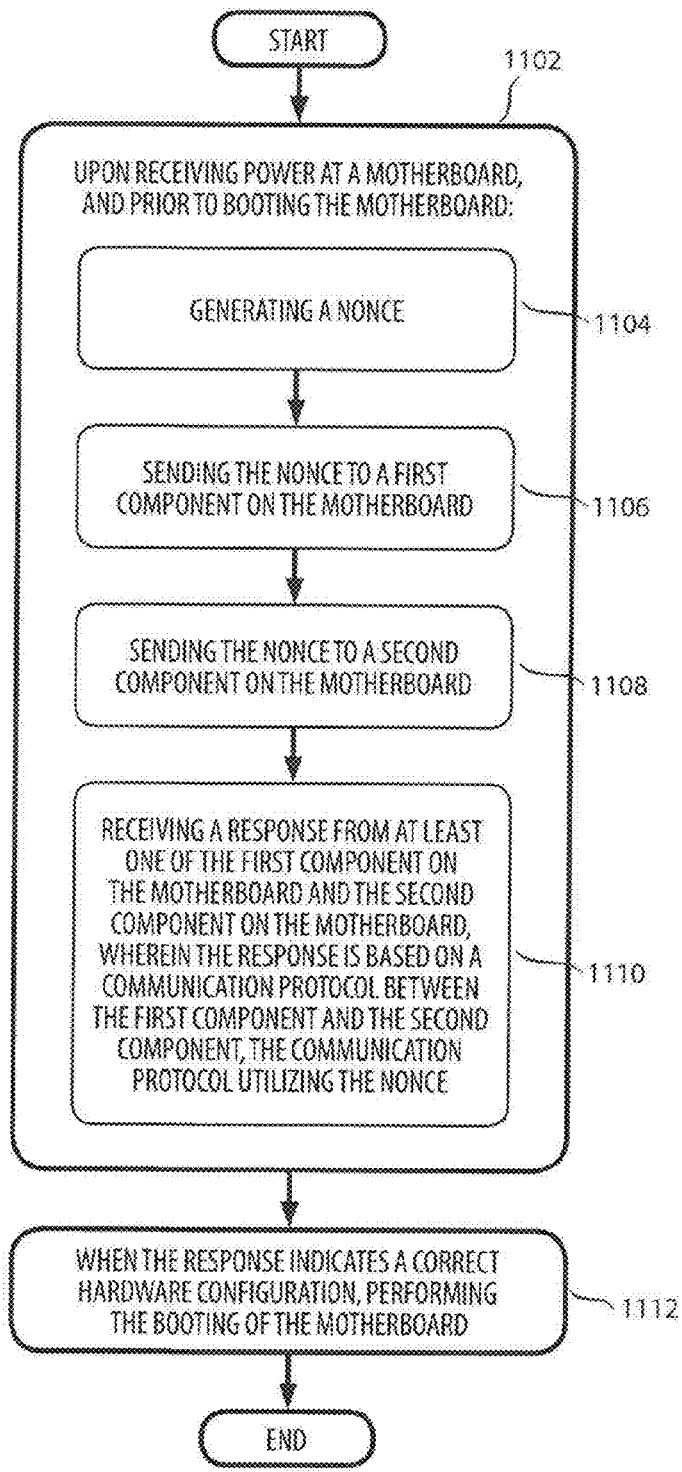
FIG. 11 illustrates an example method embodiment.

FIG. 11 illustrates a method for a system 100 configured as described herein. Upon receiving power at a motherboard, and prior to booting the motherboard (1102), the system 100: generates a nonce (1104), sends the nonce to a first component of the motherboard (1106), and sends the nonce to a second component of the motherboard (1108). The system 100 also receives a response from at least one of the first component on the motherboard and the second component on the motherboard, wherein the response is based on a communication protocol between the first component and the second component, the communication protocol utilizing the nonce (1110). When the response indicates a correct hardware configuration, performing the booting of the motherboard (1112).

The hardware configuration can be, or require, specific firmware configurations of the various components. The communication protocol can use block general purpose input/output, mathematical algorithms in conjunction with the nonce, and/or encrypting of the passphrases/nonce. Further aspects of the method can include issuing a power shutdown command of the motherboard when the response indicates an incorrect hardware configuration, and/or performing a cross-check of the response using a reverse-direction communication path between the motherboard, the first component, and the second component. The communication protocol can use a private mail box communication system between motherboard components.

The discussed methods, logic, and configurations can be mixed and merged as required. For example, while various examples focus on logic of one or more specific components of a motherboard, it is pointed out that the same concepts, checks, and verification mechanisms employed herein can be used for other motherboard components in verifying the firmware of other components beyond those discussed herein. Likewise, while the majority of the discussion has been focused on specific firmware configurations for known hardware, the concepts discussed herein can be used to verify hardware by confirming the firmware of that hardware is correctly configured.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to both server and non-server computer motherboards. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
   upon receiving power at a motherboard, and prior to booting the motherboard:
   generating a nonce using a device on the motherboard;
   sending, by the device, the nonce to a first component on the motherboard;
   wherein the first component is operable to send received nonce to a second component on the motherboard;

receiving a response from the second component on the motherboard, wherein the response is based on a first communication protocol between the first component and the second component, the first communication protocol utilizing the nonce;

determining, by the device, that the response indicates a correct hardware configuration; and performing the booting of the motherboard.

2. The method of claim 1, further comprising issuing a power shutdown command of the motherboard when the response indicates an incorrect hardware configuration.

3. The method of claim 1, wherein the communication protocol uses block general purpose input output.

4. The method of claim 1, wherein the communication protocol utilizes a mathematical algorithm in conjunction with the nonce passphrase to produce the response.

5. The method of claim 1, further comprising, prior to the sending of the nonce passphrase to the first component and prior to the sending of the nonce passphrase to the second component, encrypting the nonce.

6. The method of claim 1, wherein the communication protocol uses a private mail box communication system.

7. The method of claim 1, further comprising performing a cross-check of the response using a reverse-direction communication path between the motherboard, the first component, and the second component.

8. The method of claim 1, wherein the correct hardware configuration requires a correct firmware configuration.

9. A motherboard, comprising:
a processor;
a first component;
a second component; and
a non-transitory computer-readable storage medium having instructions stored which, when executed by the processor, cause the processor to perform operations comprising:
upon receiving power, and prior to booting of the motherboard:
generating a nonce;
sending the nonce to the first component;
sending the nonce to the second component; and
receiving a response from at least one of the first component and the second component, wherein the response is based on a communication protocol between the first component and the second component, the communication protocol utilizing the nonce; and
when the response indicates a correct hardware configuration, performing the booting of the motherboard.

10. The motherboard of claim 9, the computer-readable storage medium having additional instructions stored which, when executed by the processor, cause the processor to perform operations comprising issuing a power shutdown command of the motherboard when the response indicates an incorrect hardware configuration.

11. The motherboard of claim 9, wherein the communication protocol uses block general purpose input output.

12. The motherboard of claim 9, wherein the communication protocol utilizes a mathematical algorithm in conjunction with the nonce passphrase to produce the response.

13. The motherboard of claim 9, the computer-readable storage medium having additional instructions stored which, when executed by the processor, cause the processor to perform operations comprising, prior to the sending of the nonce passphrase to the first component and prior to the sending of the nonce passphrase to the second component, encrypting the nonce.

14. The motherboard of claim 9, wherein the communication protocol uses a private mail box communication system.

15. The motherboard of claim 9, the computer-readable storage medium having additional instructions stored which, when executed by the processor, cause the processor to perform operations comprising performing a cross-check of the response using a reverse-direction communication path between the motherboard, the first component, and the second component.

16. The motherboard of claim 9, wherein the correct hardware configuration requires a correct firmware configuration.

17. A non-transitory computer-readable storage device having instructions stored which, when executed by a computing device, cause the computing device to perform operations comprising:
upon receiving power at a motherboard, and prior to booting the motherboard:
generating a nonce;
sending the nonce to a first component on the motherboard;
sending the nonce to a second component on the motherboard; and
receiving a response from at least one of the first component on the motherboard and the second component on the motherboard, wherein the response is based on a communication protocol between the first component and the second component, the communication protocol utilizing the nonce; and
when the response indicates a correct hardware configuration, performing the booting of the motherboard.

18. The computer-readable storage device of claim 17, having additional instructions stored which, when executed by the computing device, cause the computing device to perform operations comprising issuing a power shutdown command of the motherboard when the response indicates an incorrect hardware configuration.

19. The computer-readable storage device of claim 17, wherein the communication protocol uses block general purpose input output.

20. The computer-readable storage device of claim 17, wherein the communication protocol utilizes a mathematical algorithm in conjunction with the nonce passphrase to produce the response.

* * * * *